US007015952B2

(12) United States Patent
Okada

(10) Patent No.: US 7,015,952 B2
(45) Date of Patent: Mar. 21, 2006

(54) IMAGE PROCESSING APPARATUS AND A METHOD TO COMPENSATE FOR SHAKING DURING IMAGE CAPTURE

(75) Inventor: Ryuzo Okada, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 617 days.

(21) Appl. No.: 09/948,635

(22) Filed: Sep. 10, 2001

(65) Prior Publication Data

US 2002/0036692 A1 Mar. 28, 2002

(30) Foreign Application Priority Data

Sep. 28, 2000 (JP) ............................ 2000-296836

(51) Int. Cl.
*H04N 5/228* (2006.01)

(52) U.S. Cl. ................ 348/208.1; 348/155; 348/208.4; 340/937; 396/55

(58) Field of Classification Search .. 348/208.3–208.6, 348/208.14, 208.15, 208, 208.99, 208.1, 348/155, 699, 113, 118, 154; 340/933, 937; 396/52, 421, 55

See application file for complete search history.

(56) References Cited

U.S. PATENT DOCUMENTS

| | | | | |
|---|---|---|---|---|
| 5,053,876 A * | 10/1991 | Blissett et al. | ......... | 348/208.14 |
| 5,128,874 A * | 7/1992 | Bhanu et al. | ............... | 701/301 |
| 5,259,040 A * | 11/1993 | Hanna | ........................ | 382/107 |
| 5,731,832 A * | 3/1998 | Ng | ............................. | 348/155 |
| 5,926,212 A * | 7/1999 | Kondo | .................. | 348/207.99 |
| 6,246,719 B1 * | 6/2001 | Agarwal | ................ | 375/240.16 |

FOREIGN PATENT DOCUMENTS

| | | | |
|---|---|---|---|
| EP | 449283 A2 * | 10/1991 | |
| JP | 59028606 A * | 2/1984 | |
| JP | 4-213973 | 8/1992 | |
| JP | 9-161060 | 6/1997 | |
| JP | 2813395 | 8/1998 | |
| JP | 2936793 | 6/1999 | |

OTHER PUBLICATIONS

Irani, M.; Rousso, B.; Peleg, S.; “Recovery of ego-motion using region alignment”, Pattern Analysis and Machine Intelligence, IEEE Transactions on , vol.: 19 , Issue: 3, Mar. 1997; pp.: 268-272□□.*

Hu, Zhencheng et al.; “Real-Time Multi Moving Objects Detection and Tracking from Dynamical Road Scene Using Foe”, 6th World Congress in Intelligent Transport Systems ’99.*

Burt, P.J., et al.; “Object tracking with a moving camera”, Visual Motion, 1989.,Proceedings. Workshop on , Mar. 20-22, 1989, pp.: 2-12□□.*

(Continued)

*Primary Examiner*—Ngoc-Yen Vu
*Assistant Examiner*—Gary C. Vieaux
(74) *Attorney, Agent, or Firm*—Oblon, Spivak, McClelland, Maier & Neustadt, P.C.

(57) ABSTRACT

An image processing apparatus comprises an image capture device which generates a video image containing an image shake caused by a shake of the image capture device, a region selector which selects a given image region used for detecting the image shake, a shake detector which detects an amount of the image shake within the given image region, and an image compensator which compensates the video image based on the amount of the image shake to cancel the image shake.

17 Claims, 4 Drawing Sheets

OTHER PUBLICATIONS

Irani, M.; Rousso, B.; Peleg, S.; "Recovery of ego-motion using region alignment", Pattern Analysis and Machine Intelligence, IEEE Transactions on , vol.: 19 , Issue: 3 , Mar. 1997; pp.: 268-272.*

Zhencheng Hu, et al., "Real-Time Multi Moving Objects Detection and Tracking from Dynamical Road Scene Using Foe", 6th World Congress on Intelligent Transport Systems '99.

Gideon P. Stein, et al., "A Robust Method for Computing Vehicle Ego-Motion", IEEE Intelligent Vehicles Symposium 2000, Oct. 3-5, 2000, pp. 362-368.

Tong Zhang, et al., "Fast, Robust, and Consistent Camera Motion Estimation", Proceedings of International Conference on Computer Vision and Pattern Recognition, 1999, pp. 164-170.

* cited by examiner

IMAGE PROCESSING APPARATUS AND A METHOD TO COMPENSATE FOR SHAKING DURING IMAGE CAPTURE

CROSS-REFERENCE TO RELATED

This application is based upon and claims the benefit of priority from the prior Japanese Patent Application No. 2000-296836, filed Sep. 28, 2000, the entire contents of which are incorporated herein by reference.

BACKGROUND OF THE INVENTION

1. Field of the Invention

This invention relates to an image processing apparatus and image-processing method of compensating the shake of an image obtained by a camera mounted on a mobile object represented by vehicles, such as a car.

2. Description of the Related Art

Generally, movement of a mobile object generates a shake in a video image by the unevenness of the ground, or steering of the mobile object.

In the device which detects an obstacle by analyzing the motion vector (optical flow) of each point of the video image, using the video stream inputted from a TV camera, the camera shake becomes the cause of detecting the obstacle accidentally. Therefore, it is necessary to compensate in advance the shake of a video image caused by the shake of the TV camera. In order to compensate the shake of the video image, the TV camera shake must be detected. In the method of detecting the camera shake there are a method that uses additional devices, such as an angular-velocity sensor, and a method that measures the variation in the obtained image. Moreover, in a method of compensating the image shake there are a method that compensates the image shake optically, and a method that compensates the image shake in software. The optical compensation method compensates the image shake optically by mounting an actuator, a variangle prism, etc. in TV camera. The software compensation method compensates the shake by transforming the video image based on an amount of shake, and extracting a part of the video image.

In a case where an obstacle is detected by the TV camera mounted on the mobile object, the method which compensates the shake in software is advantageous in the following points. That is, there is no fall of the durability because of a movable mechanism. Since devices other than the TV camera are unnecessary, cost can be reduced.

Moreover, when the mobile object moves at high speed, the video image obtained by the TV camera mounted on the mobile object changes violently in almost all the regions in a screen. For that reason, there is a problem that it does not know whether the motion is caused by the shake or it arises from translation of the mobile object even if the motion vector of the region in the video image is detected based on such a video image.

BRIEF SUMMARY OF THE INVENTION

It is an object of the present invention to provide an image processing apparatus and an image processing method that compensates a video image of a TV camera and the like to a video image which is not influenced by a camera shake caused by the unevenness of a road surface, or the steering of the mobile object.

According to the first aspect of the present invention, there is provided an image processing apparatus, comprising an image capture device configured to generate a video image containing an image shake caused by a shake of the image capture device, a region selector configured to select, from the video image, a given image region used for detecting the image shake, a shake detector configured to detect an amount of the image shake within the given image region, and an image compensator which compensates the video image based on the amount of the image shake to cancel the image shake.

According to the second aspect of the present invention, there is provided an image processing apparatus provided for a mobile object movable in real space, comprising: an image capture device mounted on the mobile object and configured to generate a video image containing an image shake caused by a shake of the image capture device; a region selector configured to select, from the video image, a given image region used for detecting the image shake; a shake detector configured to detect an amount of the image shake within the given image region; and an image compensator which compensates the video image based on the amount of the image shake to cancel the image shake.

According to the third aspect of the present invention, there is provided an image processing method, comprising: generating a video image containing an image shake caused by a shake of the image capture device mounted on a mobile object running a road; selecting, from the video image, a given image region used for detecting the image shake caused by running of the mobile object; detecting an amount of the image shake within the given image region; and compensating the video image based on the amount of the image shake to cancel the image shake.

DETAILED DESCRIPTION OF THE INVENTION

Figure 1:
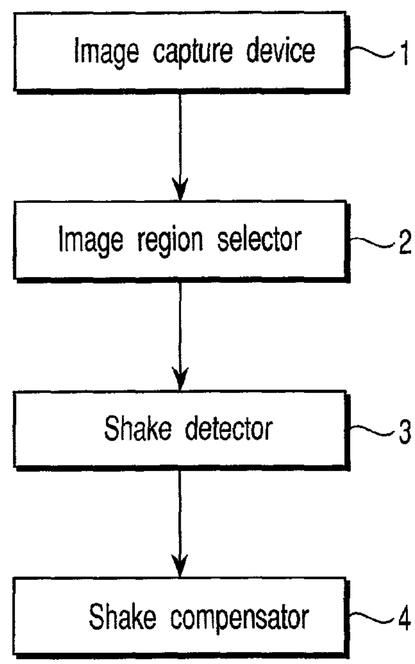
FIG. 1 is a block diagram of an image processing apparatus that compensates the shake of a mobile object, according to an embodiment of the resent invention.

In an image captured by a camera, two or more parallel straight lines in a scene look so as to be crossed at one certain point in the image. This point is called a vanishing point. The present invention is attained by paying attention to that the temporal variation of the video image caused by the translation of a vehicle other than the unevenness of a road surface or steering of the vehicle becomes minute in a specific region containing a vanishing point in the image stream from a TV camera which observes a scene from the front or the back of a mobile object. By analyzing the motion vector (optical flow) of each pixel of the image detected in this region, the rotation component corresponding to the amount of shake is computed, and an image is compensated so that this amount of shake may be set to 0.

There will now be described an embodiment according to the present invention referring to the drawings.

Figure 2:
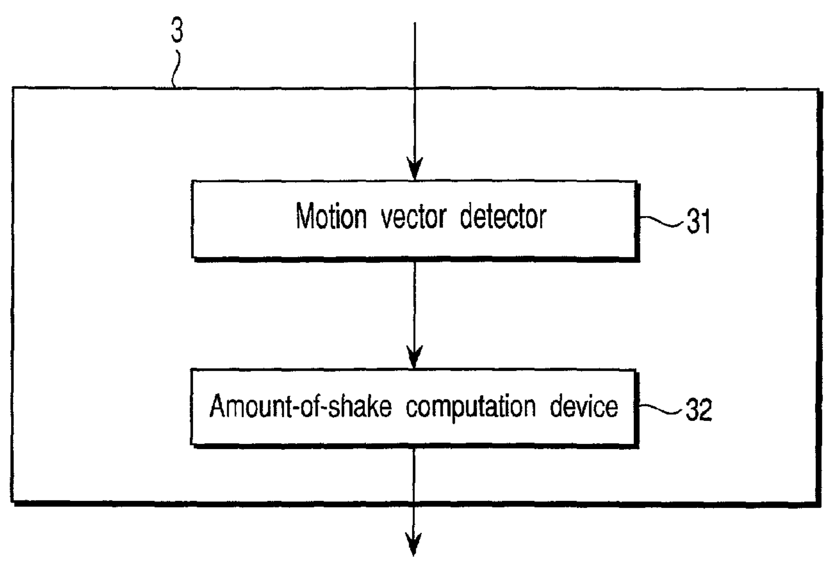
FIG. 2 is a diagram showing the internal composition of a shake detector.

FIG. 1 shows a fundamental composition of an image processing apparatus according to an embodiment of the present invention. The image processing apparatus compensates the shake of an image caused by the shake of a mobile object. As shown in FIG. 1, the image processing apparatus is equipped with an image capture device 1, an image region selector 2, a shake detector 3, and a shake compensator 4. FIG. 2 shows the example of internal composition of the shake detector 3.

The image capture device 1 generates a video image that contains a vanishing point or an area near the vanishing point in a visual field. From the video image (refer to FIG. 4) obtained by the image capture device 1, the image region selector 2 selects a region wherein the image variation caused by the translation of a vehicle other than the image shake produced by a camera shake caused by the unevenness of a road surface or steering of the vehicle is minute. The shake detector 3 detects the motion vector of each pixel in the region selected by the image region selector 2, and computes the amount of shake of the video image by analyzing the motion vector. Using the amount of shake computed by the shake detector 3, the shake compensator 4 compensates an image so that the image shake may be set to 0.

There will now be described hereinafter the image region selector 2, the shake detector 3, and the shake compensator 4.

In addition, in the following description, T→ expresses a vector T and Ω→ and v→ express a vector similarly.

First, the image region selector 2 is explained. The image region selector 2 selects a region wherein the image shake caused by the translation of a vehicle other than the image shake produced by a camera shake caused by the unevenness of a road surface or steering of the vehicle is minute.

Figure 3:
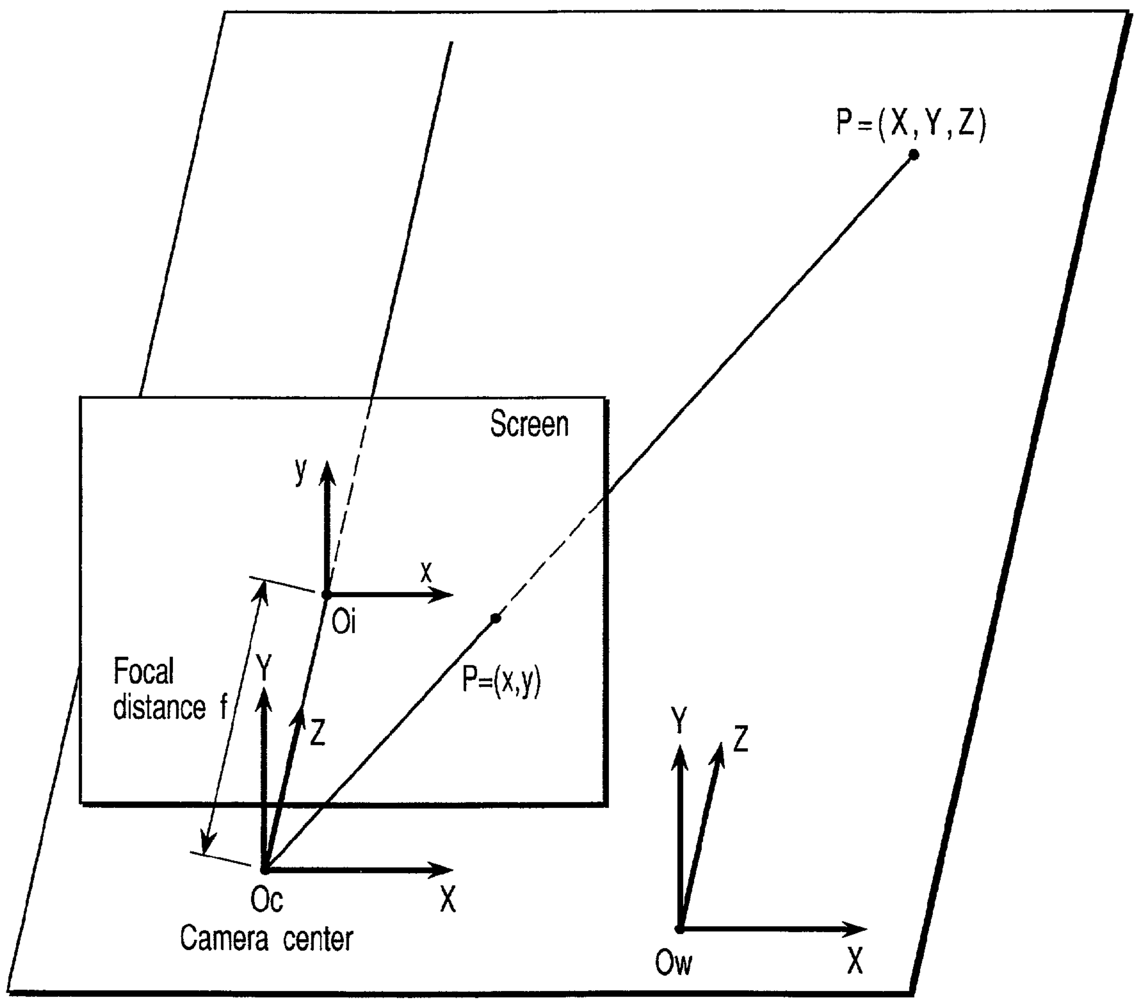
FIG. 3 is a diagram for explaining arrangement of coordinate systems.

When the vehicle provided with the TV camera moves on the ground with a velocity T→=(Tx, Ty, Tz) and an angular velocity Ω→=(Ωx, Ωy, Ωz), namely, when the coordinate system Oc-XYZ (camera coordinate system) whose origin corresponds to the camera center moves with the velocity T→ and angular velocity Ω→ with respect to the coordinate system Oω-XYZ (global coordinate system) fixed on the ground (refer to FIG. 3), the motion vector (optical flow) v→=(x, y) at the pixel p→=(x, y) projected to the image plane of a certain point P→ in a scene is expressed with the following equation:

$$u=(xy/f)\Omega x-((x^2+f^2)/f)\Omega y+y\Omega z-(f/Z)Tx+(x/Z)Tz$$

$$v=((y^2+f^2)/f)\Omega x-(xy/f)\Omega y-x\Omega z-(f/Z)Ty+(y/Z)Tz \quad (1)$$

where, Z shows the depth in the camera coordinate system of point P→. Moreover, a focal length f assumes to be known.

Supposing Z is infinite in the above equation, the term of translation is set to 0, and only the terms of angular velocity remain as shown by the following equation:

$$u=(xy/f)\Omega x-((x^2+f^2)/f)\Omega y+y\Omega z$$

$$v=((y^2+f^2)/f)\Omega x-(xy/f)\Omega y-x\Omega z \quad (2)$$

Thus, the variation of the image is mainly produced by the rotation component (Ωx, Ωy, Ωz), which corresponds to the shake of the vehicle, in the image region where Z is large.

When a camera is mounted on a mobile object (e.g., car) running on the ground, the ground which spreads infinitely converges at a certain straight line in an image. This straight line is called horizon. Generally, the straight line at which the plane spreading infinitely in the image converges is called a vanishing line.

Figure 4:
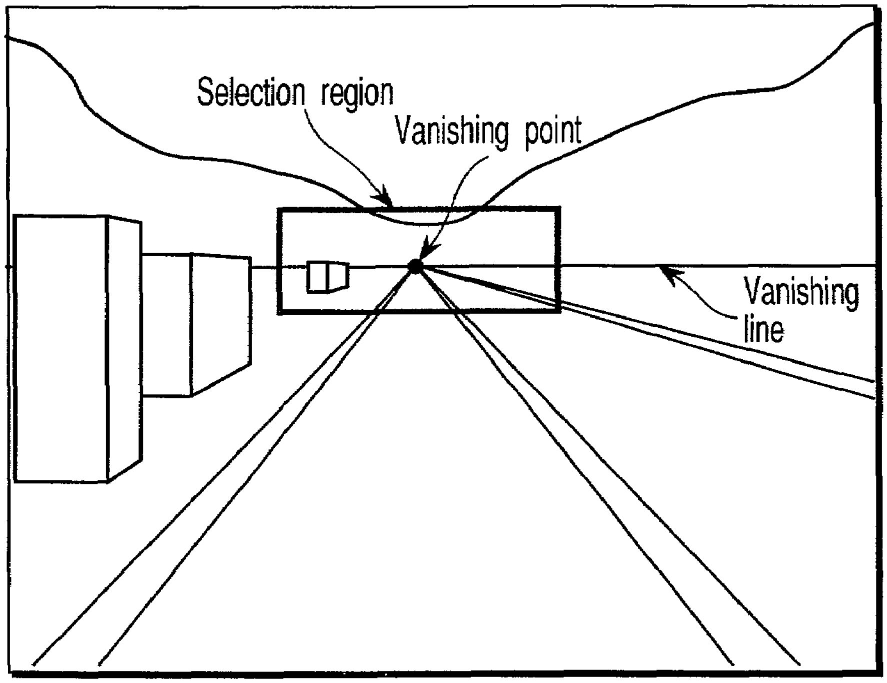
FIG. 4 is a diagram for explaining a select region.

Since Z is large near the vanishing line, variation of the image near the vanishing line is mainly influenced by the shake of the vehicle. Then, fundamentally, a region including the vanishing line and its circumference is selected as a region for shake detection. Considering the case where the car is running the road as shown in FIG. 4, the objects near the vehicle, such as buildings often exist in the region near the edge of the image. The selected region therefore is set as the region near the vanishing point as shown in FIG. 4. In this time, the position of the vanishing line is known in many cases. For this reason, the position of the vanishing line can be decided at the time of mounting the camera in the mobile object.

Moreover, the vanishing line can be determined by obtaining a vanishing point (infinite distance) as a point of intersection of two lines which are the projected lines of the parallel straight lines on the ground to the image plane.

The following method can be used for a setup of a select region.

Decide the region containing a vanishing line beforehand.

Change the size of the select region according to the speed of the vehicle such that when the speed of a vehicle is quick, the region becomes small, and when late, the region becomes large. It is also possible to set up a larger select region depending on the method of mounting the camera in the mobile object or movement of the mobile object.

When Tx component of the translation of the mobile object is minute, and the x-coordinate of an image center (origin on the image), which corresponds to the point projected to the image plane of the camera center Oc, and the x-coordinate of the vanishing point are almost equal to each other, that is, x is close to 0, the term u of the equation (1) is expressed by the following equation:

$$u=-f\Omega y+y\Omega z \quad (3)$$

Moreover, when Ty component of the translation of the mobile object is minute, and the y-coordinate of an image center (origin on the image) and the y-coordinate of the vanishing point are almost equal to each other, that is, y is close to 0, the term v of the equation (1) is expressed by the following equation:

$$v=f\Omega x-x\Omega z \quad (4)$$

What the coordinate of the image center and that of the vanishing point become equal is the case where the optical axis of the TV camera and the running direction of the vehicle are made parallel. In this case, the shake of an image is influenced by the rotation component (Ωx, Ωy, Ωz) which is the shake of the vehicle. Since the condition wherein the depth Z is large is not necessary, shake detection is able to be done if other stationary objects exist. Therefore, as shown in FIG. 5, the image region where the absolute value of x is small, or the image region where the absolute value of y is small can be selected.

Figure 5:
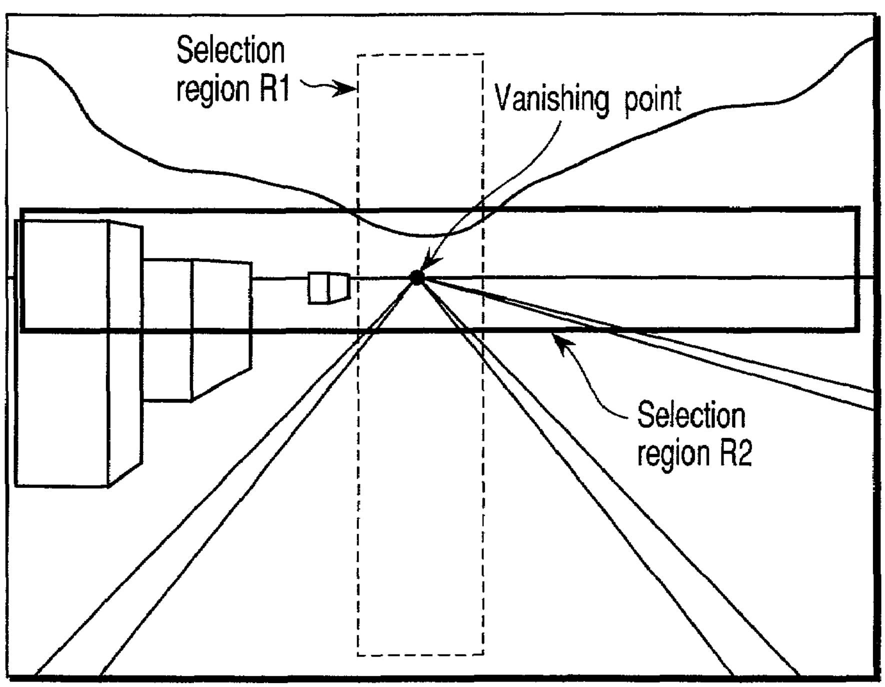
FIG. 5 is a diagram for explaining a select region in case there are particular conditions.

In FIG. 5, the select region R1 is a select region about u component when the Tx component of translation motion is minute, and the x-coordinate of the image center and the x-coordinate of the vanishing point are almost equal. The select region R1 is for detecting a lateral shake but not for detecting a vertical shake.

The select region R2 is a select region about v component when the Ty component of translation motion is minute, and y coordinate of the image center and that of the vanishing point are almost equal. The select region R2 is for detecting the vertical shake but not for the lateral shake.

Next, the shake detector 3 is explained.

As shown in FIG. 2, the shake detector 3 contains a motion vector detector 31 and an amount calculation section 32. The motion vector detector 31 computes the motion vector (optical flow) of each pixel in the select region, using an image in arbitrary time and an anterior or posterior image. This computation may be performed by the known method. The reference image is updated by the newest image, when the magnitude of a motion vector exceeds a predetermined value, or when the difference between the present time and the time when the reference image was captured becomes larger than a predetermined value.

The shake amount computation section 32 computes an amount of an image shake from the motion vector detected by the motion vector detector 31.

Since the equation (2) is applied to each of a plurality of pixels in a select region, rotation components Ωx, Ωy and Ωz are presumed using the optimization technique, such as the method of least square. They correspond to the amount of shake to be computed.

As described in the image region selector 2, when select regions R1 and R2 as shown in FIG. 5 can be set up, the equation (3) and (4) should hold in the select regions R1 and R2, respectively. The amount of shakes is similarly computed by the optimization technique, such as the least square method, using the equations (3) and (4).

Next, the shake compensator 4 is explained. The shake compensator 4 generates an image that has no shake by compensating an input image using the amount of shakes computed by the shake detector 3.

In order to generate the image which does not shake with respect to a reference frame set up by the shake detector 3, the amount of image shake (Ωx, Ωy, Ωz) computed by the shake detector 3 is used, and the amount of image shake for each pixel from the reference frame to the current frame is computed using the equation (2). The shake compensator 4 compensates the current image so that this amount of image shake may be set to 0, to generate a compensated image.

Figure 6:
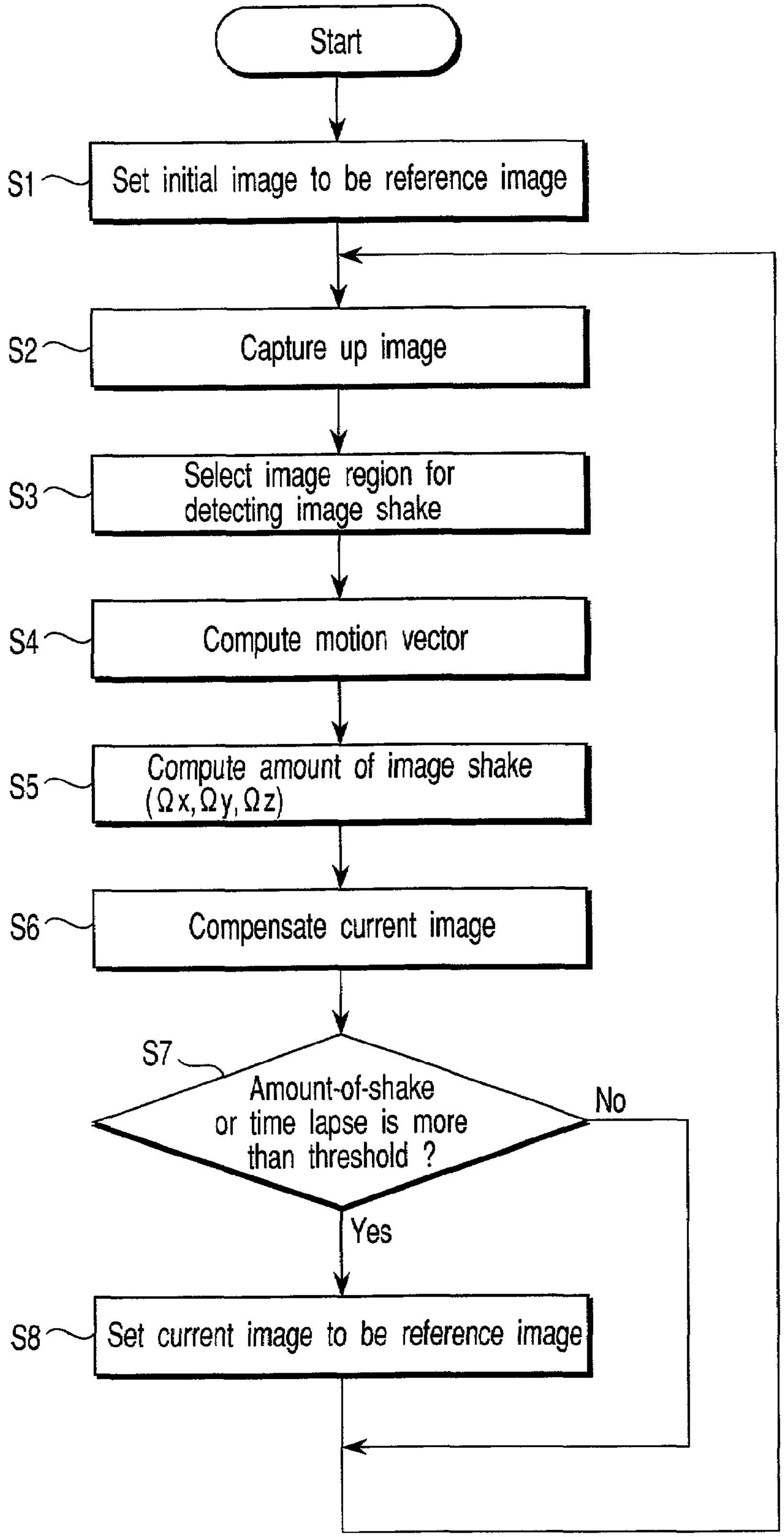
FIG. 6 is a flow chart that shows the procedure for compensating a camera shake using the image processing apparatus.

The flow of the whole processing is explained according to the flow chart of FIG. 6.

First, an initial image is set to a reference image (Step S1). Next, a video image is inputted from the image capture device 1 (Step S2). An image region used for detecting an image shake is selected by the image region selector 2 (Step S3). A motion vector is computed in the selected image region using the reference image and the current image (Step S4). Based on the motion vector, the amount of shake (Ωx, Ωy, Ωz) is computed (Step S5) in the shake computation device 32.

The current image is compensated based on the amount of shake (Step S6). It is determined whether the amount of shake, or time lapse is more than a threshold (Step S7). If this determination is YES, the reference image is set to the current image (Step S8). Processing of the steps S2–S8 is performed repeatedly.

In order to generate an image that does not shake with respect to an initial frame, it is necessary to compute the amount of shake (Ω'x, Ω'y, Ω'z) relative to the initial frame. In this case, the amount of shake (Ω'x, Ω'y, Ω'z) from the initial frame or arbitrary frame to the current image is calculated based on the following equation:

$$\Omega'i=\omega i+\Omega i \quad i=x,\ y,\ z \tag{5}$$

ωx, ωy, and ωz are initialized to 0 in the initial frame, and are updated by the following equation at the time of renewal of the reference frame.

$$\omega i=\omega Pi+\Omega i \quad i=x,\ y,\ z \tag{6}$$

where ωPi expressesωi before renewal of the reference frame.

In the shake compensator 4, the amount of image shake for each pixel is computed by the equation (2) using Ω'x, Ω'y, Ω'z, and the current image is compensated so that this amount of image shake may be set to 0.

The above function is realizable as software. Moreover, the present invention may be applied to a computer readable record medium that stores a program for making a computer execute the present image processing, for example, process shown in FIG. 6.

According to this invention, it becomes possible to compensate the image which is observed from the front or the back of a mobile object to an image which is not influenced by the camera shake caused by the unevenness of a road surface, or steering of the mobile object such as a car. As a result, the invention can contribute to evasion of malfunction in image processing, such as obstacle detection. For example, when the vehicle largely shakes, the video image largely shakes. At this time, when an object burst into the road, it cannot be discriminated from the largely shaking image. However, in the present invention, since the image shake based on the shake of the vehicle is removed, the object burst into the road can be discriminated.

The image shake includes not only a shake caused by the shake of the mobile object, e.g., vehicle but also a shake caused by a shock impacted to the TV camera mounted on the mobile object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus, comprising:

an image capture device configured to generate a video image containing an image shake caused by a shake of the image capture device;

a region selector configured to select, from the video image, a laterally elongated region for detecting a vertical shake but not for detecting a lateral shake or a vertically elongated region for detecting a lateral shake but not for detecting a vertical shake;

a shake detector configured to detect an amount of the image shake within the laterally elongated region or the vertically elongated region; and an image compensator configured to compensate the video image based on the amount of the image shake to cancel the image shake.

2. An apparatus according to claim 1, wherein the region selector selects an image region including a vanishing point corresponding to an infinite distance in a direction in which the image capture device is moved as the given image region.

3. An image processing apparatus provided for a mobile object movable in real space, comprising:

an image capture device mounted on the mobile object and configured to generate a video image containing an image shake caused by a shake of the image capture device;

a region selector configured to select, from the video image, a laterally elongated region for detecting a vertical shake but not for detecting a lateral shake or a vertically elongated region for detecting a lateral shake but not for detecting a vertical shake;

a shake detector configured to detect an amount of the image shake within the laterally elongated region or the vertically elongated region and an image compensator configured to compensate the video image based on the amount of the image shake to cancel the image shake.

4. An apparatus according to claim 3, wherein the region selector selects an image region including a vanishing point corresponding to an infinite distance of a direction in which the mobile object is moving as the given image region.

5. An apparatus according to claim 3, wherein the region selector selects a region such that a variation of the image caused by translation of the mobile object other than the shake of the image capture device caused by the unevenness of a road surface or steering of the mobile object is minute.

6. An apparatus according to claim 3, wherein the shake detector detects a motion vector of each pixel in the laterally elongated region or vertically elongated region, and computes the amount of shake of the video image by analyzing the motion vector.

7. An apparatus according to claim 3, wherein the shake detector comprises a motion vector detector and a shake-amount computation device, the motion vector detector detecting a motion vector of each pixel in the laterally elongated region or vertically elongated region, using at least two frames of the video image, and the shake-amount computation device computing the amount of image shake from the motion vector detected by the motion vector detector.

8. An apparatus according to claim 7, wherein the shake detector sets a reference frame of the video image, and the motion vector detector computes the motion vector of each pixel using the reference frame and a current frame of the video image.

9. An apparatus according to claim 8, wherein the reference frame is updated at one or both of a time when a magnitude of the motion vector exceeds a predetermined value and a time when a difference between a current time and a time when the reference frame is captured becomes larger than a predetermined value.

10. An apparatus according to claim 3, wherein the image capture device comprises a television camera mounted on a vehicle as the mobile object.

11. An image processing method, comprising:

generating a video image containing an image shake;

selecting, from the video image, a laterally elongated region for detecting a vertical shake but not for detecting a lateral shake or a vertically elongated region for detecting a lateral shake but not for detecting a vertical shake;

detecting an amount of the image shake within the laterally elongated region or the vertically elongated region; and compensating the video image based on the amount of the image shake to cancel the image shake.

12. An image processing method, comprising:

generating a video image containing an image shake caused by a shake of the image capture device mounted on a mobile object moving on a road;

selecting, from the video image, a laterally elongated region for detecting a vertical shake but not for detecting a lateral shake or a vertically elongated region for detecting a lateral shake but not for detecting a vertical shake;

detecting an amount of the image shake within the laterally elongated region or the vertically elongated region; and compensating the video image based on the amount of the image shake to cancel the image shake.

13. A method according to claim 12, wherein the step of selecting the laterally elongated region or vertically elongated region selects an image region including a vanishing point corresponding to an infinite distance in a direction in which the mobile object is moving.

14. A method according to claim 12, wherein the step of selecting the laterally elongated region or vertically elongated region selects a region wherein the image shake accompanying parallel displacement of the mobile object other than the shake of the image capture device caused by the unevenness of a road surface or steering of the mobile object is minute.

15. A method according to claim 12, wherein the step of detecting an amount of the image shake includes detecting a motion vector of each pixel in the the laterally elongated region or the vertically elongated region, and computing the amount of shake of the video image by analyzing the motion vector.

16. A method according to claim 12, wherein the step of detecting an amount of the image shake includes detecting a motion vector of each pixel in the the laterally elongated region or the vertically elongated region, using at least two frames of the video image, and computing the amount of image shake from the motion vector detected by the motion vector detector.

17. A computer readable program stored in a storing medium, the program comprising:

means for instructing a computer to input a video image containing an image shake caused by a shake of an image capture device mounted on a mobile object moving on a road;

means for instructing the computer to select, from the video image, a laterally elongated region for detecting a vertical shake but not for detecting a lateral shake or a vertically elongated region for detecting a lateral shake but not for detecting a vertical shake;

means for instructing the computer to detect an amount of the image shake within the laterally elongated region or the vertically elongated region; and means for instructing to compensate the video image based on the amount of the image shake to cancel the image shake.

* * * * *